Jan. 19, 1937.  R. STRINDBERG  2,068,282
FLUID STRAINER OR FILTER
Filed Dec. 10, 1934

INVENTOR
Richard Strindberg
BY
Geo. H. Kennedy Jr.
ATTORNEY

Patented Jan. 19, 1937

2,068,282

UNITED STATES PATENT OFFICE 2,068,282

FLUID STRAINER OR FILTER

Richard Strindberg, Worcester, Mass.

Application December 10, 1934, Serial No. 756,811

6 Claims. (Cl. 210—165)

The present invention relates to a strainer or filter for fluids, and is particularly adapted for the separation and removal, from liquids, of foreign material, no matter how fine, carried in suspension in such liquids.

In prior devices of this character, cleaning action is obtained by passing the fluid through a suitable filtering medium on which the foreign matter removed from the liquid collects in the form of a sludge, and the gradual accretion of such foreign matter eventually renders the filter ineffective or necessitates replacement. Moreover, the relatively clean liquid being pumped through the filter must pass through the accumulated foreign matter on the filter before any filtering action can take place and said liquid necessarily picks up some of the foreign matter before it reaches the filter. There is no provision for automatic removal of the accumulated sludge on the filter member, and as it increases, the pressure for forcing the liquid through the filter also increases, but without any corresponding improvement in the efficiency of the filter. One of the principal objects of the present invention is to avoid the objections to this type of filter by the provision of a filtering device which is self cleaning, so that no foreign matter can accumulate on the filtering or straining member.

Filters of the type above referred to also have no provision for controlling the efficiency of the cleaning action, that is to say, whatever the form of the filtering elements, the interstices thereof are not variable and the element will procure only a definite and predetermined cleaning action which is obviously dependent upon and controlled by the size of the interstices. Since in various filter or strainer installations varying degrees of cleanliness of the filtered liquid may be required, a filter adapted for each installation must be constructed. A further object of the present invention is to provide a filter which can be adjusted to control the efficiency of the cleaning action by controlling the size of the particles removed from the liquid as it passes through the filter.

To avoid the replacement of filter units or the removal of such units for cleaning, as is frequently necessary, especially in automobile engines where the foreign matter collects on the filtering unit, the present invention provides, in connection with a self-cleaning filtering element, a chamber separable from said element, in which is collected the foreign matter removed from the liquid by the filtering element. This chamber is removable from the filtering device without interfering with the filtering element, and being located below and on the intake side of the filtering element, collects the foreign matter as it is automatically removed from said element.

Other and further objects and advantages of the invention will more fully appear from the following detailed description taken in connection with the accompanying drawing, in which,—

Like reference characters refer to like parts in the different figures.

Figure 3:
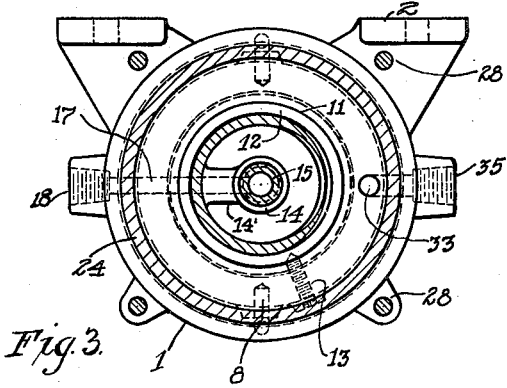
Fig. 3 is a horizontal section along the line 3—3 of Fig. 2.
Figure 4:
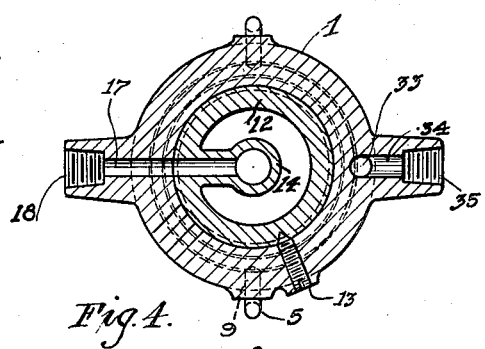
Fig. 4 is a horizontal section along the line 4—4 of Fig. 2.
Figure 2:
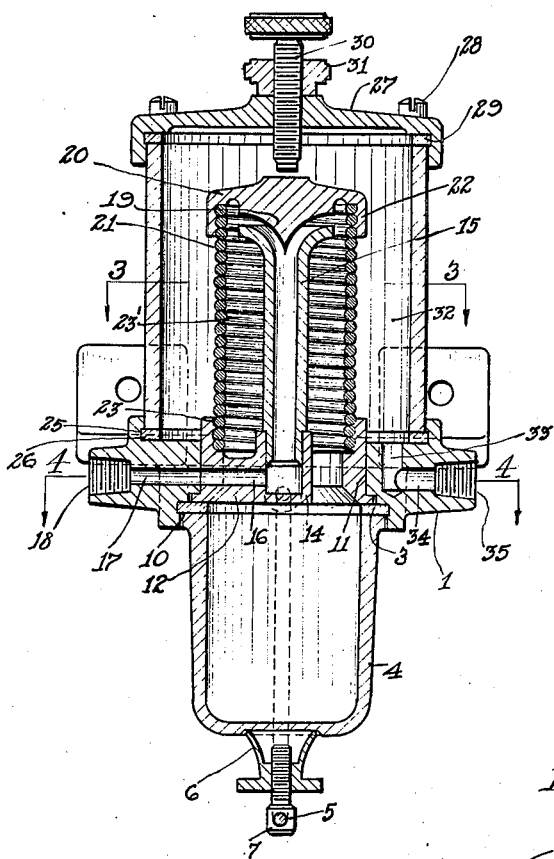
Fig. 2 is a vertical section along the line 2—2 of Fig. 1.
Figure 1:
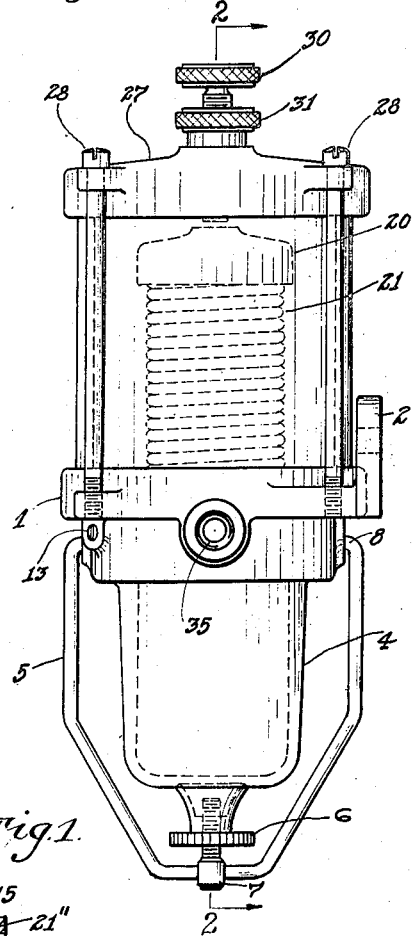
Fig. 1 is an elevation of a strainer or filter embodying the invention.

Referring to Figs. 1 and 2, the device comprises a base 1 having an integral upstanding flange 2 at one side thereof for attachment of said base to a support. The underside of the base has an annular groove 3 for the reception of the rim of an open-mouthed receptacle 4 preferably of glass, which is held in position by a bail 5 and a thumb nut 6, the latter being mounted on a stud 7 carried by the bail 5 and being engageable with the base of the receptacle. The opposite ends 8 of the bail 5 which extend upwardly on opposite sides of the receptacle are bent inwardly and engage in openings 9, Fig. 4, in the base to provide for a swinging movement of said bail. A gasket 10 provides a tight seal between the mouth of the receptacle and the base.

The base 1 has a centrally located vertical bore 11 for the reception of a member 12 held in position by a set screw 13 extending through said base and engaging with the outer surface of said member. In the construction shown, the member 12 is in the form of a single spoke wheel having a centrally located hub 14 connected to the rim of the wheel by a single spoke 14' integral with said hub and rim. The hub 14 supports a vertical tube 15 extending upwardly therefrom and a channel 16 which extends centrally through the spoke and is in alinement with a horizontal channel 17 in the base 1 provides a connection between the lower end of the tube 15 and a threaded opening 18 in said base. The tube 15 has its upper end flared to cooperate with a downwardly projecting cone 19 on a cap 20 to form an annular orifice. Said cap 20 engages over the upper end of a coil spring 21 which is positioned vertically around the tube 15, said cap having an internal helically grooved flange 22 engageable with the end of the spring and providing a fluid tight connection between said spring and cap. The lower end of said spring is received in a helical internal groove 23 within the member 12, said groove and spring forming a liquid-tight connection between said spring and member. The spring 21 is normally tightly coiled with the successive turns in engagement with each other, and said spring and cap define an inner chamber 23', the latter surrounding the vertical tube 15. Fluid connection is provided between said chamber and the receptacle 4 by the open space between the hub 14 and the member 12. The receptacle 4 forms a fluid tight closure for the lower end of the spring so that fluid under pressure directed inside the spring can escape to the discharge pipe of the device only through the spaces between the coils of the spring when the latter has been expanded by the pressure within the spring.

A cylinder 24 of glass or other suitable material is positioned around the spring 21 and has its lower end engaging in an annular groove 25 in the upper side of the base, a gasket 26 providing a tight connection therebetween. The upper end of the cylinder 24 is closed by a head 27 secured by a plurality of long screws 28 to the base, the latter being provided with threaded bores to receive said screws. A gasket 29 between said head and cylinder provides a fluid-tight connection therebetween. A thumb screw 30 having a knurled head extends centrally through the cylinder head and is held in adjusted position in spaced relation to the cap 20 by a clamping nut 31. The lower end of the thumb screw engages with said cap to limit the upward movement thereof during the operation of the spring as a filtering medium. The cylinder 24 and head 27 form a liquid-tight outer chamber 32 surrounding the coil spring and intersecting horizontal and vertical channels 33 and 34 in the base provide a fluid connection between said chamber and a threaded opening 35 in the base.

It will be apparent that the coil spring 21 can be readily removed from within the device without completely dismantling the latter. When the receptacle is removed the member 12, together with the coil spring and the cap 20, can be withdrawn from within the chamber 32 by loosening the set screw 13. Thus if it becomes necessary to substitute one coil spring for another it can be easily effected without removal of the entire device and without interfering with the inlet and outlet connections thereof.

In operation, a pump is connected to either of the openings 18 or 35 for pumping oil or other liquid or gases through the device, the latter entering through the opening 18 and exhausting through the opening 35. Since the upper end of the spring is closed by the cap 20 and since the lower end of the spring is closed by the receptacle 4, the only escape for fluid within the spring is through the spaces between the coils of the spring which are formed as the latter is expanded and thus as a differential in fluid pressure is built up between the inner chamber 23' and the outer chamber 32, the adjacent coils of the spring are slightly spaced apart by the upward movement of the cap 20 into engagement with the end of the thumb screw. Since the movement of the cap is limited, the spacing between adjacent coils of the spring is correspondingly limited and is relatively small, and as the fluid passes between adjacent coils, any particles of foreign matter larger in size than the spacing between the coils will be retained within the spring. Clean fluid escapes in the form of a film between adjacent coils of the spring into the chamber 32 for discharge.

As the foreign matter collects within the spring, it passes downwardly inside thereof and into the receptacle 4 which can be emptied when a sufficient amount of foreign matter is collected. Any small particles adhering to the inner surface of the spring are removed each time that the pump is started, since the fluid passing from the annular discharge orifice washes downwardly over the inner surface of the spring and provides a flushing action to remove any adhering foreign matter. The same flushing action is also taking place during the operation of the filter. It will be apparent that by varying the position of the thumb screw the spacing between adjacent coils of the spring may be varied to control the size of the particles removed, thereby controlling the efficiency of the cleaning action. When the pump which forces the fluid through the device is stopped, the differential in pressure between the inner and outer chambers causes a surging action of the fluid from the outer to the inner chamber, thereby aiding in removing the accumulated foreign matter on the inside of the spring.

Figure 5:
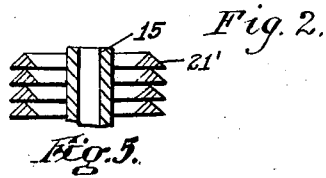
Fig. 5 is an enlarged fragmentary section of a modified form of the filtering medium.

In the modification of Fig. 5, the wire forming the coil spring 21' instead of having the usual cylindrical cross-section, as in the structure of Figs. 1 to 4 inclusive, has a wedge-shaped cross-section. Thus, the foreign matter passing downwardly from within the spring and into the receptacle 4 does not have a tendency to enter the space between adjacent coils. As shown, the lower edge of each adjacent coil of the spring is spaced inwardly from the upper edge of the adjacent coil therebeneath and the foreign matter passing downwardly accordingly cannot accumulate on the upper edge of the adjacent coils. The foreign matter is flushed away from the coils of the spring by the fluid entering within said spring from the annular discharge orifice in the same manner above set forth.

Figure 6:
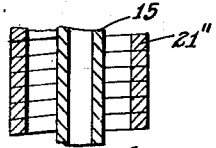
Fig. 6 is an enlarged fragmentary section of another modified form of the filtering medium.

In the modification of Fig. 6 the wire forming the coil spring 21" is square in cross-section so that instead of line contact, as with the ordinary spring of circular cross-section, or in the modification of Fig. 5, there is a definite surface engagement between adjacent coils which will in certain cases provide the desired filtering action. At the same time, since the inner surface of the coil spring is smooth, the flushing action of the fluid entering the spring will be very effective in the removal of accumulated foreign matter.

From the foregoing, it will be apparent that the present invention provides a strainer or filter for fluids which is self-cleaning and which also provides for the accumulation of the foreign matter in a receptacle spaced from the filtering element so that the foreign matter may be removed without affecting said element. Moreover, the filtering medium being in the form of a coil spring can be adjusted for a more or less efficient cleaning action to accommodate said filter or strainer to various filtering requirements.

I claim,

1. In a filter, a vertically positioned coil spring having adjacent coils thereof in contact when the filter is not in operation and between the adjacent coils of which the material being filtered is forced, a cap on the upper end of said spring, the latter being open at the bottom to receive the liquid being filtered, and means engageable with said cap to limit the opening movement of said spring for controlling the spacing between adjacent coils thereof.

2. In a filter, a vertically positioned coil spring having adjacent coils thereof in contact when the filter is not in operation and between the adjacent coils of which the material being filtered is forced, a cap on the upper end of said spring, the latter being open at the bottom to receive the liquid being filtered, means engageable with said cap to limit the opening movement of said spring for controlling the spacing between adjacent coils thereof, and means for adjusting said limiting means for controlling the cleaning action of the filter.

3. In a filter, a filter member in the form of a coil spring having sufficient inherent resiliency to maintain adjacent coils in contact when the filter is not in operation, means for directing fluid to the inside of said spring for expanding said spring during the filtering action, and means for limiting the expansion of said spring, resulting from the admission of fluid under pressure to the inside thereof, for controlling the space between adjacent coils through which the fluid under pressure passes for the filtering action.

4. In a filter, a filter member in the form of a coil spring having adjacent coils in contact when the filter is not in operation and positioned on a substantially vertical axis, said spring being free to expand lengthwise for spacing the adjacent coils of the spring in response to the entrance of fluid within said spring, means for directing fluid into said spring adjacent the upper end thereof for flushing impurities from said coils, and a collecting chamber beneath said spring and having a communication with the inside thereof for receiving impurities.

5. A filter comprising a helical wire member in the form of a coil spring having sufficient inherent resiliency to hold adjacent coils of the spring in contact when the filter is not in operation, means for directing fluid under pressure to the inside of the wire member, means for rendering the ends of said spring fluid tight to prevent escape of fluid therethrough, and one end of the spring being free to move to permit expansion of the spring as a result of the pressure of the fluid inside the spring, said spring upon expansion providing a filtering passage between the spring coils, and means for limiting the expansion of the spring for controlling the efficiency of the filtering action.

6. A filter comprising a helical wire member in the form of a coil spring having sufficient inherent resiliency to hold adjacent coils of the spring in contact when the filter is not in operation, said spring being vertically positioned, means for directing fluid under pressure to the inside of the wire member, a cap for making the upper end of said spring fluid tight to prevent escape of fluid therethrough said upper end being free to move to permit expansion of the spring as a result of the pressure inside the spring, the lower end of the spring being mounted against movement, a collecting chamber located beneath the lower end of the spring and providing a fluid tight connection with the lower end of the spring to prevent escape of fluid through the lower end of said spring, said spring upon expansion providing a filtering passage between the spring coils, and means for limiting the expansion of the spring for controlling the efficiency of the filtering action.

RICHARD STRINDBERG.